(12) United States Patent
Haimer

(10) Patent No.: US 7,182,558 B2
(45) Date of Patent: Feb. 27, 2007

(54) TOOL HOLDER FOR A TOOL THAT CAN ROTATE ABOUT AN AXIS OF ROTATION

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 189 days.

(21) Appl. No.: 10/451,359

(22) PCT Filed: Dec. 27, 2001

(86) PCT No.: PCT/EP01/15325

§ 371 (c)(1),
(2), (4) Date: Jun. 19, 2003

(87) PCT Pub. No.: WO02/051571

PCT Pub. Date: Jul. 4, 2002

(65) Prior Publication Data

US 2004/0052598 A1    Mar. 18, 2004

(30) Foreign Application Priority Data

Dec. 27, 2000   (DE) ............................... 100 65 383

(51) Int. Cl.
*B23B 51/14* (2006.01)
*B23B 31/00* (2006.01)

(52) U.S. Cl. .................. 409/234; 29/447; 408/240; 279/4.03

(58) Field of Classification Search .......... 409/234; 29/243, 447, 446, 450, 508, 517; 279/103, 279/145, 139, 4.03, 4.05, 4.06; 408/239 A, 408/56, 240; 407/11

See application file for complete search history.

(56) References Cited

U.S. PATENT DOCUMENTS

| 4,721,423 | A | * | 1/1988 | Kubo | 409/234 |
| 4,809,426 | A | * | 3/1989 | Takeuchi et al. | 483/8 |
| 4,856,177 | A | * | 8/1989 | Takeuchi et al. | 483/9 |
| 5,311,654 | A | * | 5/1994 | Cook | 29/447 |
| 5,378,091 | A | * | 1/1995 | Nakamura | 409/132 |
| 6,060,694 | A | * | 5/2000 | Hauser | 219/221 |
| 6,216,335 | B1 | * | 4/2001 | Freyermuth | 29/701 |
| 6,488,285 | B1 | * | 12/2002 | Allard | 279/4.03 |
| 6,938,903 | B1 | * | 9/2005 | Haimer | 279/4.03 |

FOREIGN PATENT DOCUMENTS

| DE | 198 27 109 C1 | 3/2000 |
| DE | 198 34 739 C1 | 3/2000 |
| DE | 199 28 995 A1 | 12/2000 |
| EP | 1 084 782 A1 | 3/2001 |
| EP | 0 662 023 B1 | 12/2001 |

(Continued)

*Primary Examiner*—Dana Ross
(74) *Attorney, Agent, or Firm*—Edwards Angell Palmer & Dodge LLP; Scott D. Wofsy

(57) ABSTRACT

A tool holder is disclosed for a boring, milling or reaming tool that can rotate about an axis of rotation. At the end of its clamping shank that is located on the side of the tool, the tool holder has a bush part with a mounting opening, which is centered with regard to the axis of rotation and which is provided for accommodating a fixing shank of the tool. The mounting opening for a bush part can be radially expanded to a width, which enables the fixing shank to be inserted or removed, particularly by means of eddy currents that are magnetically induced inside the bush part by an induction coil. In addition, the mounting opening can, by cooling, be radially contracted to a width that holds the fixing shank with an interference fit.

8 Claims, 6 Drawing Sheets

FOREIGN PATENT DOCUMENTS

| | | |
|---|---|---|
| WO | WO 99/65643 | 12/1999 |
| WO | WO 00/76703 A1 | 12/2000 |
| WO | WO 01/19558 A1 | 3/2001 |
| WO | WO 02/05992 A1 | 1/2002 |

* cited by examiner

TOOL HOLDER FOR A TOOL THAT CAN ROTATE ABOUT AN AXIS OF ROTATION

The invention relates to a tool holder for a tool that can rotate about an axis of rotation, in particular a drilling, milling or reaming tool.

It is known, for example from U.S. Pat. No. 5,311,654, to hold the fixing shank of a drilling, milling or reaming tool in an interference fit in a mounting opening which is concentric to its axis of rotation of a bush part which is closed in an annular manner. The bush part forms the tool-side end of a conventional tool-holder for connection to the rotating spindle of the machine tool and, by heating, for example by means of eddy currents magnetically induced in the bush part, can be radially expanded to a width enabling the fixing shank of the tool to be pushed in or pulled out. When the fixing shank is pulled out, the inside diameter of the mounting opening of the tool holder, at the working temperature of the machine tool, is slightly smaller than the outside diameter of the fixing shank of the tool, so that, after the cooling of the bush part, expanded by heating, to the working temperature of the machine tool, the fixing shank is shrunk in place in the bush part. The frictional forces transmitted in the shrink fit are sufficiently large in order to be able to transmit, despite the absence of positive locking, the torque required for the machining operation from the tool holder to the tool.

During the insertion of the fixing shank into the tool holder, the bush part can be sufficiently heated before the fixing shank is exposed to the heat source. However, if the fixing shank is to be pulled out of the bush part again, the bush part must be heated so quickly that the region of the mounting opening expands more quickly than the fixing shank of the tool, the fixing shank in this case likewise being exposed to the heat source. To pull the fixing shank out of conventional tool holders, comparatively high tensile forces are therefore often required.

The object of the invention is to improve the design of a tool holder, holding the fixing shank of a rotating tool in a shrink fit, in a simple manner in such a way that the tool can be removed again from the tool holder without any problems.

From a first aspect, the invention is based on a tool holder for a tool that can rotate about an axis of rotation, in particular a drilling, milling or reaming tool, said tool holder comprising:
a clamping shank which, at its tool-side end, has a bush part closed in an annular manner and having a mounting opening, concentric to the axis of rotation, for a fixing shank of the tool, the mounting opening, by heating the bush part, in particular by means of eddy currents magnetically induced in the bush part, being radially expandable in a way enabling the fixing shank of the tool to be pushed in or pulled out and being radially shrinkable, by cooling, to a width holding the fixing shank in an interference fit.

The above object is achieved according to the first aspect of the invention in that the bush part has heat-insulating means which, during heating of a radially outer circumferential region of the bush part, in particular by means of eddy currents magnetically induced in the bush part, reduce the thermal conductivity of a radially inner circumferential region of the bush part compared with the radially outer circumferential region, or/and in that cooling means are assigned to the bush part, these cooling means, during heating of a radially outer circumferential region of the bush part, in particular by means of eddy currents magnetically induced in the bush part, reducing the rate of change of the temperature increase in a radially inner circumferential region of the bush part.

The heat-insulating means or/and the cooling means ensure that the radially inner circumferential region, that is to say that region of the bush part which is next to the clamping surface of the mounting opening, is heated less quickly than the radially outer circumferential region, which is closer to the external heat source, of the bush part. In this way, the heating of the radially inner circumferential region and thus of the fixing shank of the tool is delayed. Since the radially inner circumferential region and the radially outer circumferential region are firmly connected to one another, the radial tensile forces produced during the expansion of the radially outer circumferential region also expand the radially inner circumferential region at the same time, so that the fixing shank of the tool is released from its interference fit very quickly and without being excessively heated itself.

The bush part is preferably heated by eddy currents, magnetically induced in the bush part, by means of an induction coil which encloses said bush part and carries an alternating current. The bush part is made of metal, that is to say of an electrically conductive material, and is preferably also magnetically conductive in order to concentrate the magnetic flux of the induction coil upon itself. In a preferred configuration, a plurality of apertures reducing the radial heat-conducting cross section of the bush part are provided in the radially inner circumferential region of the bush part. These apertures reduce not only the heat-conducting cross section but also the magnetic circuit cross section available for the magnetic flux of the induction coil, with the result that the eddy currents heating the bush part are concentrated on its radially outer circumferential region. Similar effects occur if the apertures are intended for heat-exchange contact with a gaseous or liquid coolant.

The torque which can be frictionally transmitted from the bush part to the fixing shank of the tool depends on the lateral surface area, which can be brought into contact with the fixing shank, of the mounting opening. In order to ensure as large a lateral surface area of the mounting opening as possible, the apertures are preferably designed as passages running entirely in the material of the bush part. In this case, the radially inner circumferential region, forming the mounting opening for the fixing shank of the tool, of the bush part is firmly connected, in particular in one piece and homogeneously, to the radially outer circumferential region by material webs situated between the passages. The passages may run essentially parallel to the axis of rotation, and several rows of passages may be provided in a staggered manner in the radial direction in order to increase the total passage cross section.

For the thermal insulation, the apertures or passages may contain air; however, they may also be filled with a thermally insulating solid material.

To cool the radially inner circumferential region of the bush part, the apertures or passages may be connected to a coolant delivery device, such as, for example, a cooling-air fan or a cooling-water source, so that the bush part, during the heating, can at the same time be cooled in a positive manner in its radially inner region. Given an adequate cooling capacity, the thermally insulating effect of the passages may possibly also be negligible.

In the preferred configurations explained above, the radially inner circumferential region of the bush part is firmly connected to the radially outer bush part, so that the radially outer bush part, during the thermal expansion, can exert radial tensile forces on the radially inner bush part. In a preferred configuration, however, the heat-insulating means may already form the radially inner circumferential region. It is also not necessary to transmit radial tensile forces in every case, provided provision is made to ensure that the radially inner bush part forming the heat-insulating means can certainly transmit compressive forces for the shrink-fitting process but if need be can elastically expand during the expansion for the unshrinking of the fixing shank of the tool. Suitable embodiments, such as, for example, corrugated bushes or bushes slotted in the axial direction, are those which can be pressed by the radially outer circumferential region of the bush part for the shrink fit against the fixing shank of the tool, but which at most surround the fixing shank with their radial elasticity during the expansion of the radially outer circumferential region and thus release the fixing shank during the expansion of the outer circumferential region. Such a bush body forming the heat-insulating means may be made, for example, of ceramic.

The idea explained above of designing the heat-insulating means as a bush body which can be separated from the tool holder, irrespective of heat-insulating and/or cooling properties, also has advantages both for the production cost of the tool holder and for the problem-free unshrinking of the tool from the tool holder. From a second aspect independent of the first-mentioned aspect, the object of the invention is to improve the design of a tool holder, holding the fixing shank of the rotating tool in a shrink fit, in a simple manner in such a way that the tool can be removed again from the tool holder without any problems.

From the second aspect, too, the invention is based on a tool holder for a tool that can rotate about an axis of rotation, in particular a drilling, milling or reaming tool, said tool holder comprising: a clamping shank which, at its tool-side end, has a bush part closed in an annular manner and having a mounting opening, concentric to the axis of rotation, for a fixing shank of the tool, the mounting opening, by heating the bush part, in particular by means of eddy currents magnetically induced in the bush part, being radially expandable to a width enabling the fixing shank of the tool to be pushed in or pulled out and being radially shrinkable, by cooling, to a width holding the fixing shank in an interference fit.

The second aspect of the invention is characterized in that a bush body transmitting the radial interference-fit forces of the bush part to the fixing shank is inserted into the mounting opening, the bush wall of this bush body being closed in an annular manner in the circumferential direction, at least in the wall region transmitting the interference-fit forces, and having a multiplicity of axially elongated passages arranged next to one another in the circumferential direction.

Irrespective of whether the bush body has heat-insulating properties or cooling means are assigned to it, the production of the tool holder is considerably simplified, since the bush part, forming the mounting opening, of the tool holder runs on a larger diameter than the bush body inserted into the mounting opening. The bush part of the tool holder therefore expands to a greater degree during the heating and permits radially elastic yielding of the bush body, even if the latter has still not achieved a thermal expansion releasing the fixing shank of the tool. On account of the improved expansion behavior, the bush body can be produced with comparatively large tolerances and can thus be produced in a simple manner without impairing the unshrinking behavior, in particular from tool shanks having a small diameter. Since the bush body according to the invention has a bush wall closed in an annular manner in the circumferential direction, high torques can also be transmitted with high precision from the tool holder to the shank of the tool. Unlike in the case of bush bodies which are slotted in a radially continuous manner, the torque which can be transmitted is not reduced or is only reduced slightly.

The bush body can be produced in a comparatively simple manner if the passages are designed as axially elongated recesses which are arranged on the outer lateral surface or/and on the inner lateral surface of the bush wall and are open toward the outer lateral surface or toward the inner lateral surface but are closed to the respectively other lateral surface. The recesses are expediently designed as radial slots having slot walls essentially parallel to one another and are preferably narrower in the circumferential direction of the bush body than in the radial direction in order to weaken the bush cross section transmitting the torque as little as possible.

The recesses, in the manner of a corrugated bush, may be provided alternately on the outer lateral surface and the inner lateral surface, in which case, if need be, recesses adjacent in the circumferential direction may overlap one another radially.

Alternatively, however, the recesses may also be arranged only on the inner lateral surface of the bush lateral surface, or else the passages may be situated entirely in the bush wall and be designed, for example, as axial bores. If the slots are provided only on the inner lateral surface of the bush lateral surface, the wall region closed in an annular manner remains at the outer circumference, a factor which improves the expansion behavior of the bush body.

The passages preferably open out freely at the surface of the bush body axially on both sides of the wall region transmitting the pressing forces, in particular at the end faces of said bush body or else at lateral surface regions in which they are no longer covered by the fixing shank of the tool or by the mounting opening of the bush part. In this way, the passages, during operation of the tool, can at the same time be used in a manner known per se for feeding lubricant or coolant to the tool.

The mounting opening of the bush part preferably has a circular-cylindrical inner surface extending essentially completely up to a tool-side end face of the bush part. It goes without saying that the mounting opening, in this connection, may also be regarded as extending completely up to the end face when the edge of the end face merges into the mounting opening with a slight chamfer of, for example, less than 1 mm axial length. In the case of a bush part of such a design, provision is preferably made for the bush body to be completely inserted axially into the mounting opening, so that its wall region transmitting the pressing forces extends essentially completely up to the tool-side end face of the bush part. Here, too, slight chamfers may be provided. An advantage of such a configuration is that the bush body, on the tool side, can be used essentially completely for transmitting interference-fit forces.

The bush body is preferably axially longer than its wall region transmitting the interference-fit forces. On its side axially remote from the tool, the bush body in each case has an inner lateral surface region enclosing the fixing shank of the tool at a radial distance. This has the advantage that the bush body can be better fixed in the mounting opening of the bush part of the tool holder axially outside its wall region transmitting the interference-fit forces, and in addition this lengthening of the bush body can be used for guiding the tool shank during the shrink fitting and tilting can be reliably avoided. It goes without saying that the radial distance in this case may also be very small.

The axial length of that wall region of the bush body which transmits the interference-fit forces is expediently selected in accordance with the diameter of the tool shank. A suitable axial length is preferably between 2 to 5 times, in particular about 3 times, the diameter.

Since the bush body need not have thermal insulating properties, it is preferably made of high-temperature steel.

The bush body explained above increases the effective diameter, for the shrink-fit expansion, of the bush part of the tool holder for a given nominal diameter of the tool shank and thus reduces the requirements for maintaining production tolerances, in particular in the case of small diameters. Corresponding advantages can also be achieved from a third aspect of the invention if the slots increasing the effective shrink-fit diameter relative to the nominal size are incorporated directly in the bush part, which is otherwise closed in an annular manner; the bush body is thus connected to the bush part virtually integrally and in one piece.

From the third aspect, the tool holder for a tool that can rotate about an axis of rotation, in particular a drilling, milling or reaming tool, again comprises a clamping shank which, at its tool-side end, has a bush part closed in an annular manner and having a mounting opening, concentric to the axis of rotation, for a fixing shank of the tool, the mounting opening, by heating the bush part, in particular by means of eddy currents magnetically induced in the bush part, being radially expandable to a width enabling the fixing shank of the tool to be pushed in or pulled out and being radially shrinkable, by cooling, to a width holding the fixing shank in an interference fit, and is characterized in that the bush part has a multiplicity of axially elongated radial slots arranged next to one another in the circumferential direction and open toward the mounting opening and is closed in an annular manner in its circumferential region radially adjoining the slots on the outside and merges in one piece into web regions remaining between the slots.

Also from this aspect of the invention, it is not important for the radially inner circumferential region of the bush part to be thermally insulated from the radially outer circumferential region. However, the thermal insulation may be present. The slots shift the diameter of the bush part effective for the thermal expansion radially outward and increase its effective diameter relative to the nominal diameter of the mounting opening by their radial depth. The slots preferably begin at the tool-side end of the bush part and extend in the axial direction over at least 5 to 10 mm, since the unshrinking problems are greatest here, but preferably over at least the length of that region of the mounting opening which transmits the interference-fit forces and may if need be have a radial depth changing in the axial direction, in particular a radial depth decreasing from the insertion side of the tool shank toward the clamping shank. The radial depth of slots adjacent in the circumferential direction may also be different.

In order to reduce the contact area, transmitting the torque, of the mounting opening as little as possible, the width of the slots in the circumferential direction is as small as possible. The slots expediently have a width in the circumferential direction of between 0.1 mm and 0.5 mm.

The radial depth of the slots determines the increase in that diameter of the bush part which is effective for the thermal expansion. The radial depth is measured in such a way that an effective expansion diameter is obtained, which allows the mounting opening to be produced with sufficiently large tolerances, which are thus simple to realize. Since the effective expansion diameter of the bush part is to be all the greater, the smaller the nominal diameter of the mounting opening is, provision is made in a preferred configuration for the radial depth of the slots in that region of the mounting opening which transmits interference-fit forces, at a nominal diameter of the mounting opening less than or equal to 10 mm, to be greater than 0.1 times the nominal diameter, preferably equal to or greater than 0.2 times the nominal diameter. At a nominal diameter of the mounting opening less than or equal to 6 mm, the radial depth of the slots is preferably greater than 0.15 times the nominal diameter, but better equal to or greater than 0.3 times the nominal diameter, and, at a nominal diameter of the mounting opening less than or equal to 3 mm, the radial depth is expediently greater than 0.2 times the nominal diameter, but preferably equal to or greater than 0.5 times the nominal diameter. These dimensions ensure that the web regions of the bush part which remain between the slots are sufficiently flexurally rigid during torque loading.

The number of slots arranged in the circumferential direction preferably at equal angular distances is to be a compromise between sufficient bearing capacity of the web regions remaining between the slots on the one hand and the improvement in the expansion behavior of the bush part on the other hand. At least six slots, but better at least eight slots, are expediently provided. However, there are expediently fewer than 20 slots.

Preferred exemplary embodiments of the invention are explained in more detail below with reference to a drawing, in which.

Figure 1:
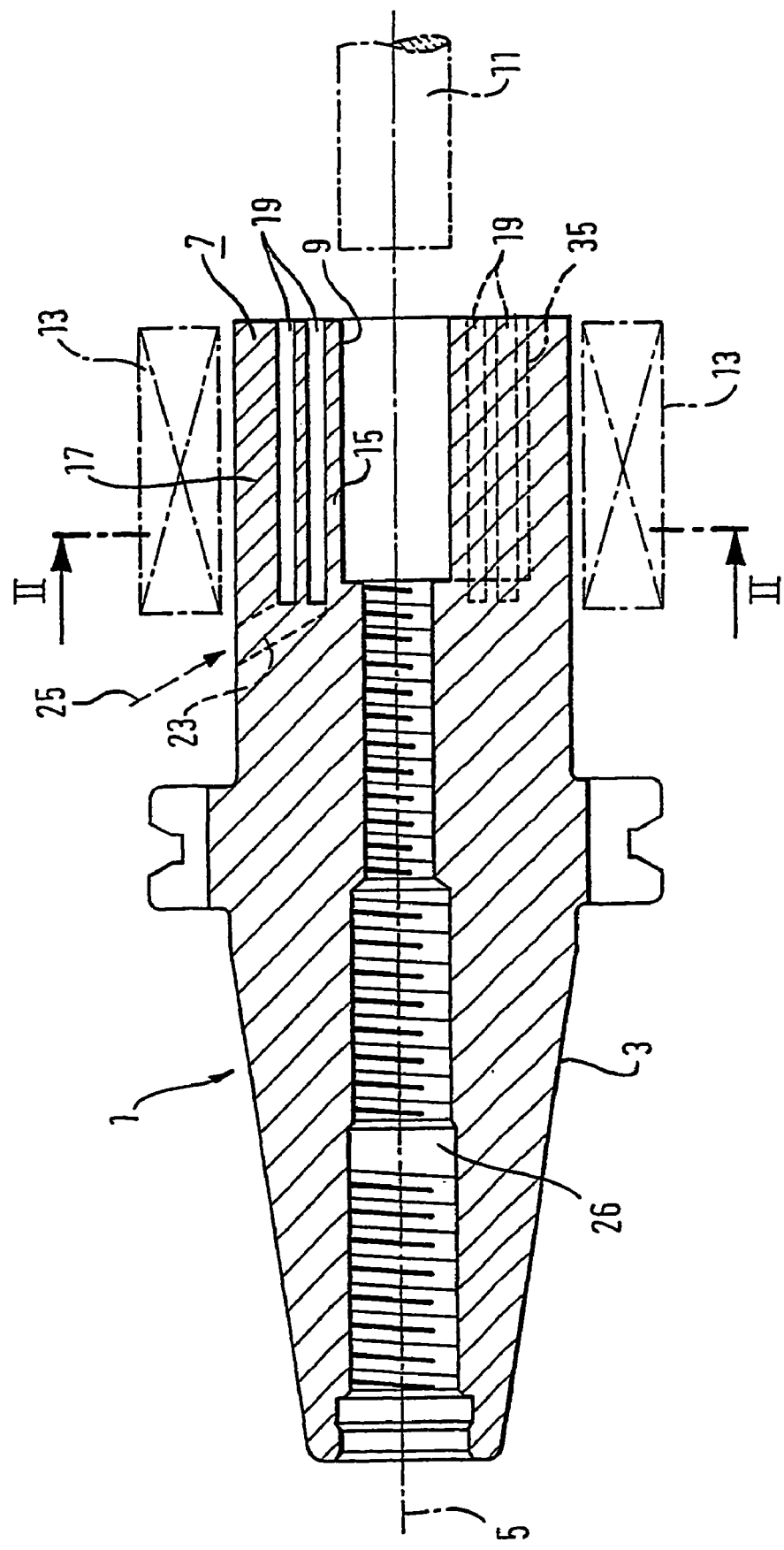
FIG. 1 shows an axial longitudinal section through a tool holder according to the invention.

The tool holder shown in FIG. 1 has a clamping shank 1 which in this case is in one piece but if need be is also composed of a plurality of pieces and which has at one of its ends a conventional spindle coupling 3, here in the form of a standard taper, with which it can be inserted in a rotationally locked manner and coaxially to its axis of rotation 5 into a corresponding receptacle of a rotating work spindle of a machine tool. At its end axially remote from the work spindle, the clamping shank 1 has a bush part 7 which is concentric to the axis of rotation 5, is closed in an annular manner, is made in a homogeneous manner of a ferromagnetic material, for example steel, and contains a mounting opening 9 which is concentric to the axis of rotation 5 and is essentially cylindrical in this case and which is intended for a fixing shank, indicated at 11, of a rotating tool, for example a drill, milling cutter or a reaming tool. The nominal inside diameter of the cylindrical mounting opening 9 is slightly smaller than the nominal outside diameter of the fixing shank 11, so that the bush part 7 is able to hold the fixing shank 11, inserted into the mounting opening 9, in a torque-transmitting manner in an interference fit or shrink fit without additional positive-locking elements.

The bush part 7, which is cylindrical at its outer circumference in the exemplary embodiment shown, but if need be also tapers conically toward the tool, can be heated inductively by means of an induction coil which encloses the bush part 7 on the outside, is indicated at 13 and carries an alternating current. The induction coil extends over most of the axial length of the bush part and induces eddy currents in the electrically and magnetically conductive material of the bush part 7, and these eddy currents, in addition to the magnetic losses of the magnetic hysteresis of the material of the bush part, electrically heat the bush part. Due to the heating, the bush part and thus the mounting opening expand radially, with the result that the fixing shank 11, in the heated state of the bush part 7, can be inserted into or pulled out of the mounting opening 9. If the bush part 7 is cooled down to the working temperature of the machine tool, for example to ambient temperature, when the fixing shank 11 is inserted, the bush part 7 is shrunk onto the fixing shank 11 in an interference fit.

The design of the induction coil 13 and of the alternating-current generator required for its operation is known per se and is not to be explained further here. Since the induction effect of the induction coil 13 increases with increasing frequency, a higher-frequency alternating current is preferred for feeding the induction coil.

The fixing shank 11 of the tool, in a similar manner to the bush part 7, is usually made of both an electrically and magnetically conductive metal, such as steel for example, and would likewise be heated by induced eddy currents. Whereas the bush part 7, during the insertion of the fixing shank 11, can be inductively heated before the fixing shank 11 is brought sufficiently close to the magnetic field, it must be ensured when removing the tool that the bush part 7 expands more quickly than the fixing shank 11, which is likewise exposed to the heating. So that the heating of a radially inner circumferential region 15 of the bush part 7 which is adjacent to the mounting opening 9 is delayed relative to the heating of a radially outer circumferential region 17 of the bush part 7, the bush part 7, close to the mounting opening 9, contains a multiplicity of passages 19 which run parallel to the axis of rotation 5 and radially reduce the heat-conducting cross section of the bush part 7 and thus thermally insulate the radially inner circumferential region 15 from the radially outer circumferential region 17. The passages 19 contain air, but may also be filled with another thermally insulating material, such as, for example, solid insulating material, for instance heat-resistant plastic. Remaining between the passages 19 are web-like material regions 21, which firmly connect the radially inner circumferential region 15 to the radially outer circumferential region 17 in an integral manner. If the circumferential region 17 is thermally expanded, the material webs 21 transmit radial tensile stresses to the inner circumferential region 15. On account of the delayed heating of the inner circumferential region 15, the outer circumferential region 17 can be heated to a greater extent than hitherto, with the result that the bush part 7 can be expanded to a greater inside diameter than hitherto without the fixing shank 11 of the tool following with the same rate of change. In this case, too, the expansion is effected more quickly than hitherto.

The passages 19 may be designed as chambers closed all round, but are expediently open at least at one of their ends, here the tool-side end, in order to permit a cooling convection flow. Both ends of the passages 19 are preferably open directly or indirectly to the environment of the tool holder and allow a coolant to flow through the bush part 7. In the tool holder of FIG. 1, the end of the passages 19 which is remote from the tool is connected individually, in groups or jointly for all the passages to at least one further passage 23, which, as indicated by an arrow 25, permits a positive flow through the bush part 7, at least during the inductive heating phase of the tool unshrinking operation. Via the passage 23, cooling air can be blown through the passages 19, for example by a cooling-air fan. It goes without saying that a cooling liquid, for example cooling water, may also be used for cooling the bush part 7, this cooling water, if need be, being pumped through the passages 19 in a closed cooling-water circuit. FIG. 1 shows the coolant flow toward the tool side of the tool holder. The direction of flow may of course be the other way round. The passages 19, instead of being connected to the outer circumference of the clamping shank 1, may also be connected to a central bore 26 of the clamping shank 1, which as a rule is present anyway in the clamping shank 1 and extends right into the mounting opening 9.

Figure 2:
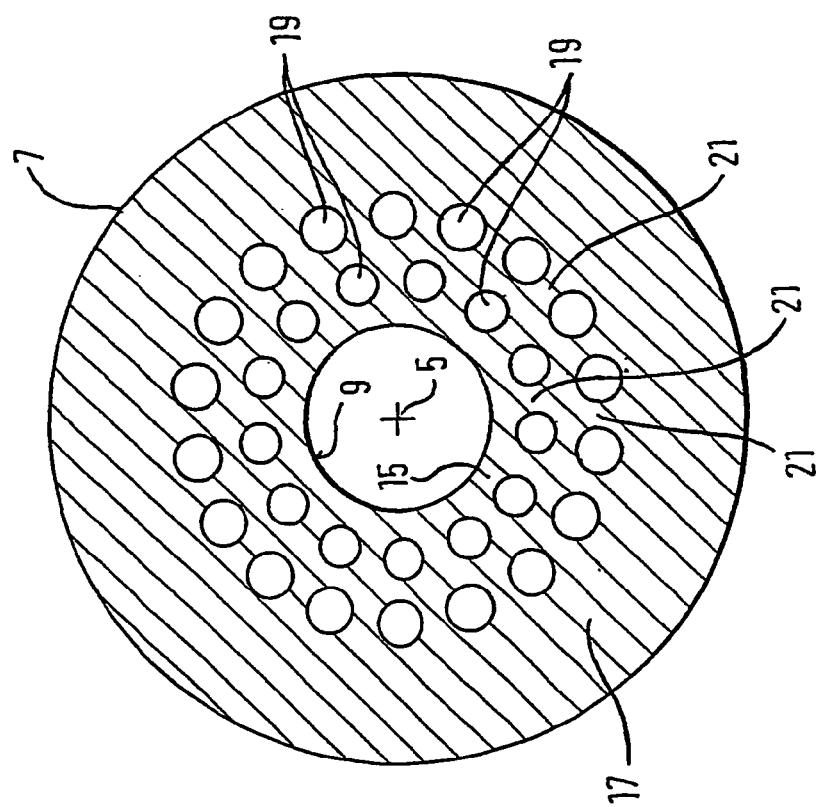
FIG. 2 shows an axial cross section through the tool holder along line II—II in FIG. 1.

In the tool holder of FIGS. 1 and 2, the passages 19 are designed as circular-cylindrical bores. Variants of axially normal cross-sectional shapes of the passages are explained below, as may advantageously be provided instead of the circular-cylindrical passages of FIGS. 1 and 2. Components having the same effect are designated with the reference numerals of FIGS. 1 and 2 and are provided with a letter for differentiation. To explain the construction and the functioning, reference is made in each case to the entire description.

Figure 3:
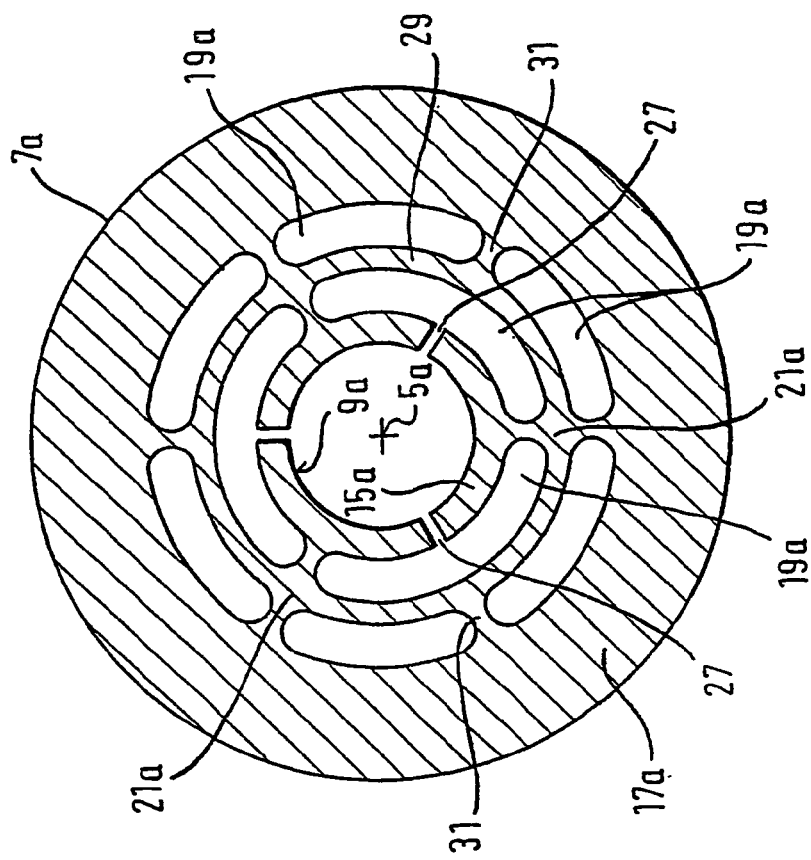
FIGS. 3 to 8 show axial cross sections through the bush part of variants of the tool holder from FIG. 1.

FIG. 3 shows a variant in which the passages 19a extending parallel to the axis of rotation 5a have a circle segment shape in the axially normal cross section and are arranged concentrically to the axis of rotation 5a on two diametral circles having different diameters. The passages 19a arranged on the two diametral circles are distributed in sectors in the circumferential direction, so that radially extending webs or spokes 21a remain between the radially outer circumferential region 17a and the radially inner circumferential region 15a, and these webs or spokes 21a connect these two circumferential regions of the bush part 7a to one another for the transmission of tensile forces. It goes without saying that the radial orientation of the webs is also advantageous in the variant of FIG. 2. Whereas in the embodiment in FIG. 2 the radially inner circumferential region 15 is closed in the circumferential direction, slots 27 running at least over part of the axial length of the bush part 7 are provided in the variant in FIG. 3 between webs 21a which are adjacent in the circumferential direction, these slots 27 reducing the tensile forces which are required for expanding the radially inner circumferential region 15a. The slots connect the mounting opening 9a to passages 19a on the smaller diametral circle. Here, and in the individual case below, the slots 27 may be dispensed with. To stabilize the annular wall 29 separating the two rows of passages 19a from one another, the passages 19a on the larger diametral circle are shorter in the circumferential direction than the passages 19a arranged on the circle of smaller diameter, so that the wall 29 remains connected to the radially outer circumferential region 17a via webs 31 which remain in between.

Figure 4:
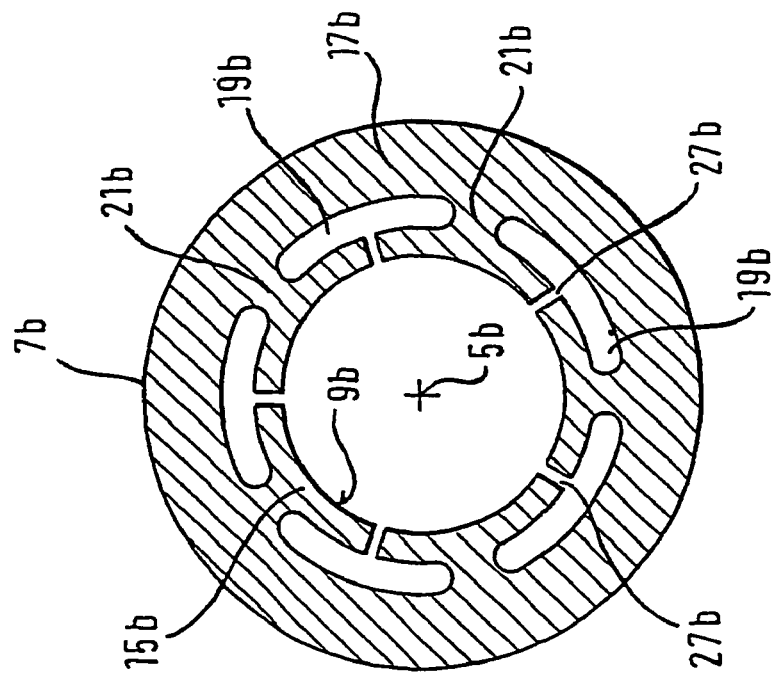

FIG. 4 shows a variant which differs from the embodiment in FIG. 3 merely by the fact that only one circumferential row of passages 19b is provided, the method of arranging them corresponding to the passages of the circle in FIG. 3 arranged on a smaller diameter.

Figure 5:
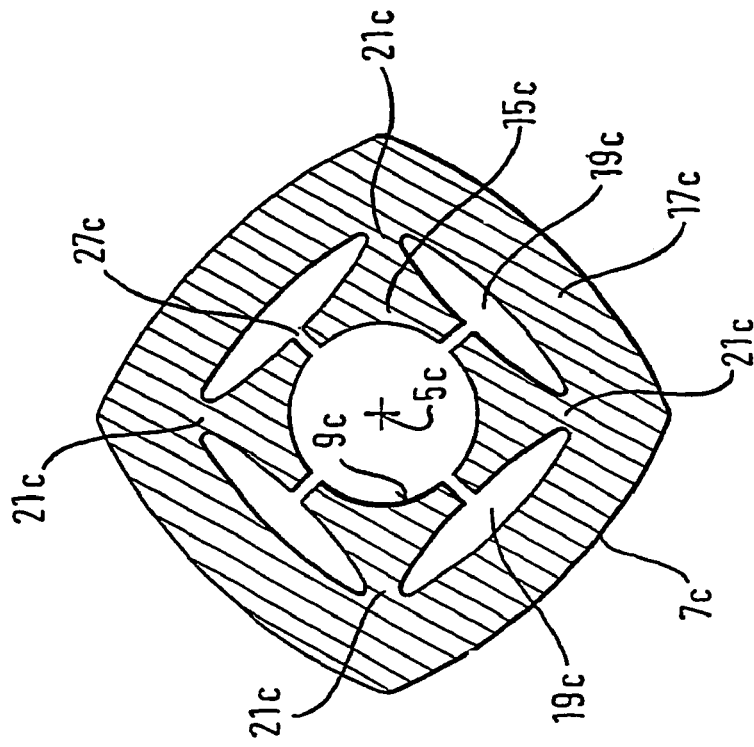

In the embodiments explained above, the bush part has a circular shape in axial cross section. FIG. 5 shows a variant in which the bush part 7c has a polygonal shape in axial cross section, here the shape of a square with a boundary rounded in a crowned manner. Accordingly, the passages 19c also extend in an elongated manner along the boundary and have a lenticular cross-sectional contour.

Figure 6:
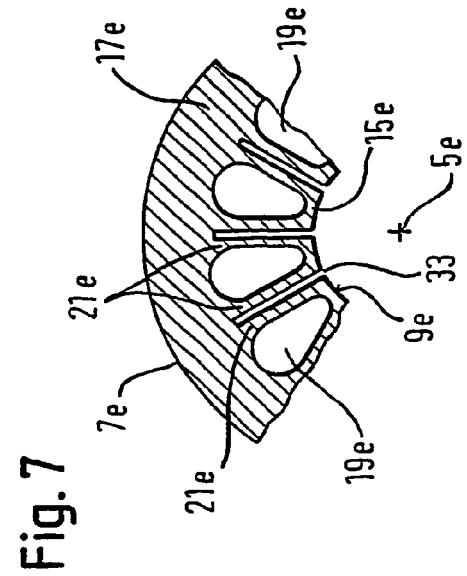

In the embodiments in FIGS. 3 to 5, the cross-sectional shape of the passages is longer in the circumferential direction of the bush part than in the radial direction. FIG. 6 shows a variant in which the passages 19d are designed as slot structures which are elongated in the radial direction and whose width in the circumferential direction is smaller than their length in the radial direction. As in the embodiments explained above, the slots 19d extend in an axially parallel manner to the axis of rotation 5d, webs 21d which remain between the slots 19d again integrally connecting the radially outer circumferential region 17d of the bush part 7d to the radially inner circumferential region 15d. The radially inner circumferential region 15d is closed in an annular manner in the circumferential direction.

Figure 7:
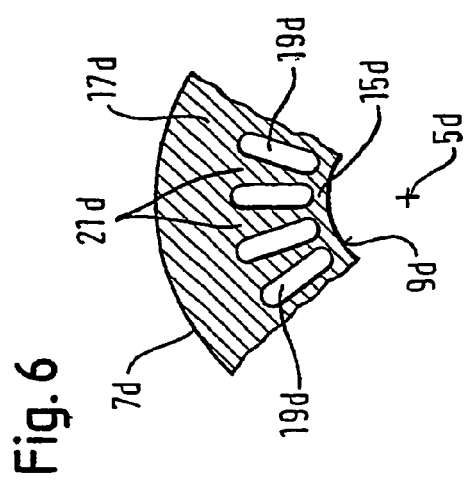

In the embodiment in FIG. 6, the passages 19d have an approximately uniform width over their radial height. The webs 21d remaining between the passages 19d are accordingly wider radially on the outside than radially on the inside, with the result that the heat-conducting cross section decreases only gradually toward the radially inner circumferential region 15d. FIG. 7 shows a variant in which the passages 19e are adjacently wider in the circumferential direction in the circumferential region 17e than on their side facing the circumferential region 15e. The webs 21e accordingly have an essentially uniform circumferential width over their radial height and, for reducing their heat-conducting cross section, additionally have a slot 33 extending radially inward from the mounting opening 9e between adjacent passages 19e. The slot 33 extends in a radial plane parallel to the axis of rotation 5e. In this way, the inner lateral surface of the mounting opening 9e is divided into a plurality of segments.

Figure 8:
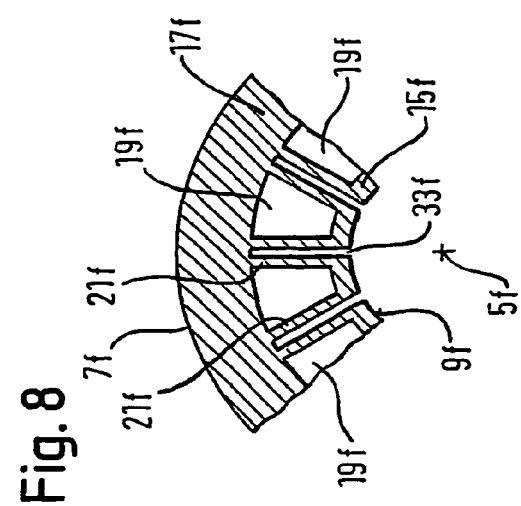

FIG. 8 shows a variant which differs from the embodiment in FIG. 7 only by the axial cross-sectional shape of the passages 19f. Whereas the passages 19e in FIG. 7 have longitudinal edges rounded in the shape of an arc of a circle in axial cross section toward the circumferential regions 17e and 15e, these longitudinal edges in the variant in FIG. 8 run on diametral circles about the axis of rotation 5f. The passages 19f accordingly have an approximately trapezoidal shape.

Figure 9:
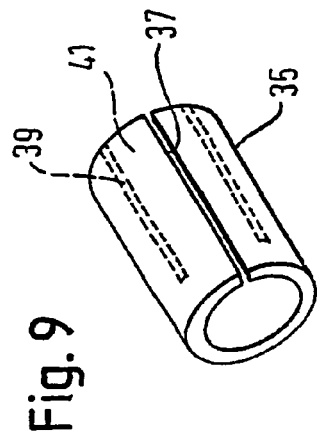
FIG. 9 shows a perspective representation of a bush body which can be inserted in the tool holder for heat insulation.

In the embodiments explained above, the radially outer circumferential region 17 of the bush part 7 is connected to the radially inner region 15 via material webs so as to be resistant to tensile force. Such a connection resistant to tensile force is unnecessary if the radially inner region 15, as indicated at 35 (FIG. 1), is designed as a bush body which can transmit radial compressive forces of the outer circumferential region 17 to the fixing shank 11 and has heat-insulating properties. Properties which transmit the tensile force between the outer circumferential region 17 and the inner circumferential region 15 may be dispensed with if this bush body 35 can be expanded at least slightly elastically in the circumferential direction, so that, when the radially outer circumferential region 17 is thermally expanded for pulling out or inserting the fixing shank 11, at most the low retaining forces of the bush body 35 have to be overcome. The bush body 35 may be designed, for example, as a corrugated bush which is made of an elastic material, such as steel for example, and whose corrugation at the same time forms the heat-insulating/coolant passages explained above. Axially slotted bushes are also suitable, at least one axially continuous slot providing for the elastic expandability of the bush, or if need be a plurality of axially discontinuous slots producing a radially elastic tongue structure or a radially elastic meander structure of the bush body. These bush bodies may also be made of metal. However, bush bodies made of ceramic material are also especially suitable. FIG. 9 shows a bush body of the last-mentioned type having a single slot. The slot can be seen at 37. In addition, axially discontinuous slots which form tongues 41 between them are shown at 39 in FIG. 9. Embodiments having an additional bush body 35 also have the advantage that they permit greater expansions of the mounting opening 9 than hitherto, since the radially outer circumferential region 17 producing the interference fit runs on a larger outside diameter than would be the case with bush parts which extend directly up to the fixing shank 11 of the tool.

Figure 10:
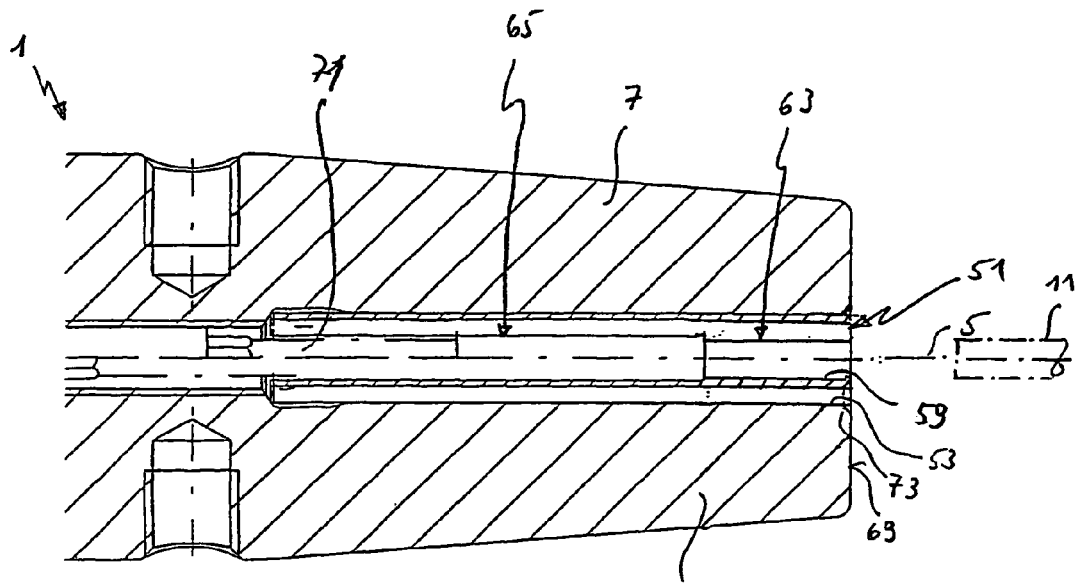
FIG. 10 shows an axial longitudinal section through the bush part, intended for accommodating the tool shank, of a variant of a tool holder according to the invention.
Figure 11:
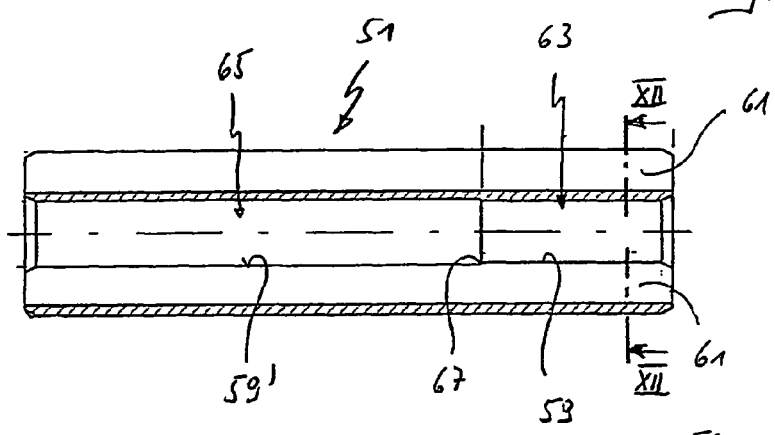
FIG. 11 shows an axial longitudinal section through a bush body inserted into the tool holder according to FIG. 10.
Figure 12:
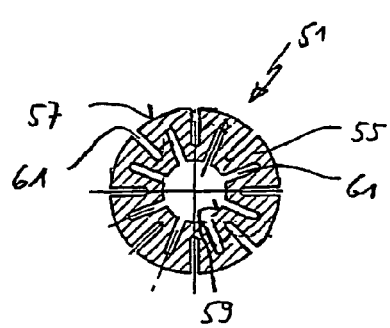
FIG. 12 shows an axial cross section through the bush body along line XII—XII in FIG. 11.

FIGS. 10 to 12 show a variant of the previous tool holder 1 explained with reference to FIG. 1, in the bush part 7 of which a bush body 51 similar to the bush body 35 is inserted. To accommodate the bush body 51, the bush part 7 again has a circular-cylindrical mounting opening 53 which is concentric to the axis of rotation 5 and is formed by an outer circumferential region 17, closed in an annular manner, of the bush part 7. The bush body 51 on its own, i.e. when the tool is not yet clamped, sits in the mounting opening 53 in a radially elastic manner in frictional connection, to be precise in such a way that the bush body 51 can be exchanged in operation. The radial elasticity of the bush body 51 is so great that the bush body 51 can follow a thermal expansion of the circumferential region 17 of the bush part 7 by means of an induction coil, as has been explained above with reference to FIG. 1.

The bush body 51, as best shown by FIGS. 11 and 12, is designed as a corrugated body over its entire axial length and has a bush wall 55 closed in the circumferential direction. Alternating in the circumferential direction, axially elongated slots 61 start from the outer lateral surface 57 and from the inner lateral surface 59 of the bush wall 55 and extend in radial longitudinal planes in each case with slot walls parallel to one another but do not extend up to the other lateral surface 59 or 57, respectively. The depth of the slots 61 in the radial direction is greater than their width in the circumferential direction, slots which are adjacent in the circumferential direction overlapping one another radially. In order to weaken the wall cross section as little as possible, the slots 61 are between 0.1 and 0.3 mm wide, and viewed overall there are between 10 and 20 slots 61, specifically 16 slots 61 in the exemplary embodiment shown, which results in an adequate compromise between radial bearing capacity of the bush body 51, its torque-transmitting capacity and its radial elasticity. Since the bush wall 55 is closed in the circumferential direction on account of the meander or corrugated structure, the bush body 51 can transmit a comparatively high torque from the bush part 7 to the tool shank 11.

As FIG. 11 shows, the inner lateral surface 59, machined in a circular-cylindrical manner at least when the bush body 51 is inserted into the mounting opening 53, is stepped in the direction of the axis of rotation 5 and, in its region 63 facing the insertion side of the tool shank 11, has an inside diameter which allows interference-fit forces to be transmitted from the bush part 7 to the tool shank 11. The region 63 allowing the transmission of interference-fit forces to the tool shank 11 has an axial length of between two to five times, here about three times, the diameter of the inner lateral surface 59. Directed axially away from the insertion side of the tool shank 11, the bush body 51 is lengthened in a region 65, in which the diameter of the inner lateral surface 59' is slightly enlarged with a step 67 being formed, so that the inner lateral surface 59' runs at a slight radial distance from the tool shank 11 when the latter is held in an interference fit in the region 63. The lengthening region 65 of the bush body 51 improves the torque-transmitting capacity of the bush body 51 and provides for slight axis tilting errors of the tool shank 11 during the shrink fitting of the latter.

As FIG. 10 shows, the bush body 51 is inserted essentially completely into the mounting opening 53 of the bush part 7 and terminates approximately flush with its end face 69. The region 63 transmitting interference-fit forces is thus completely enclosed by the bush part 7, so that the bush body 51 can transmit pressing forces in the entire region 63. In addition, the free length of the tool shank 11 which projects beyond the bush part 7 is reduced to the minimum. The region 65 enlarged in diameter, as FIG. 10 also shows, accommodates an adjusting screw 71 which can be screwed in the bush part 7 and serves as an axial stop for the defined shrink fitting of the tool shank 11. Insofar as the above bush body 51 terminates flush with the end face 69, this also includes a termination with chamfers, as are indicated, for example, at 73.

The bush body 51 and the bush part 7 are expediently made of the same material, for example high-temperature steel. The slots 61 primarily provide for the radial elasticity of the bush wall 55, otherwise closed in an annular manner, without appreciably reducing the thermal conductivity of the bush body 51. The improvement in the unshrinking behavior of a tool holder provided with the bush body 51 therefore results primarily from the greater expansion of the region 17 of the bush part 7 as a result of the greater radius.

Figure 13:
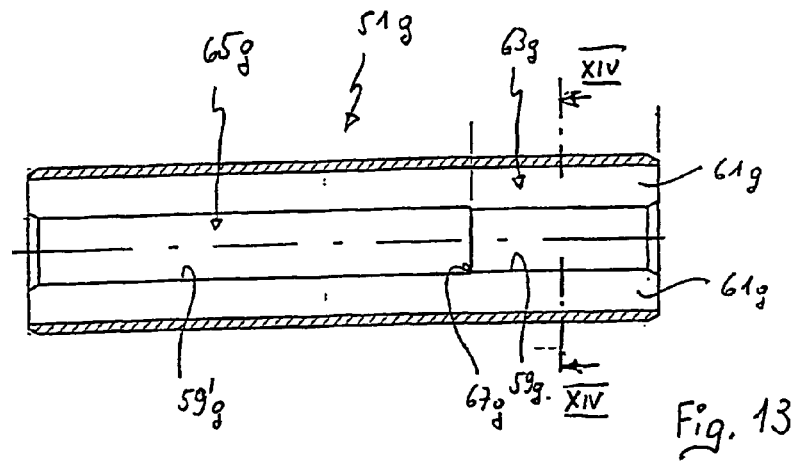
FIG. 13 shows an axial longitudinal section through a variant of the bush body from FIG. 11.
Figure 14:
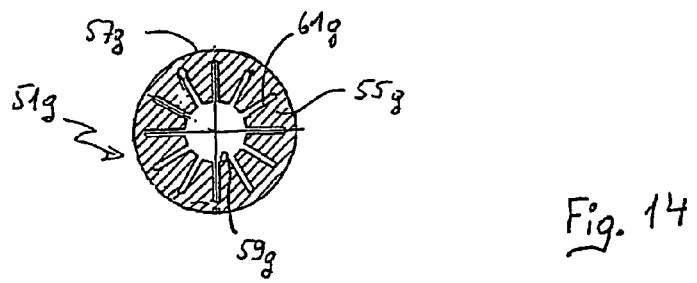
FIG. 14 shows an axial cross section through the bush body along line XIV—XIV in FIG. 13.

FIGS. 13 and 14 show a variant of the bush body 51 which can be used in a corresponding manner instead of this bush body in the tool holder 1 in FIG. 10. Components having the same effect are designated with the reference numerals of FIGS. 10 to 12, supplemented by a letter, here "g". To explain the construction and the functioning, reference is made to the description with regard to FIGS. 10 to 12 and additionally to the description with regard to FIG. 1.

Unlike the bush body 51 in FIGS. 10 to 12, only slots 61g which start from the inner lateral surface 59g are provided in the bush wall 55g of the bush body 51g in FIGS. 13 and 14. Here, too, the circumferential width of the 10 to 20, here 16, slots 61g, which may be between 0.1 and 0.3 mm, is considerably smaller than the radial depth of the slots 61g. The outer lateral surface 57g of the bush body 51g is closed cylindrically. Since the slots start from the inner lateral surface 59g, the outer lateral surface 57g, which is extensible to a greater degree on account of its greater circumferential length, is available for the radial expansion. Here, too, the region of the inner lateral surface is stepped in the axial direction to form a region 63g of smaller diameter transmitting pressing forces and a lengthening region 65g which serves to improve the fixing of the bush body 51g in the tool holder, has a larger diameter of the inner lateral surface 59'g, is adjacent to that side of the region 63g which is remote from the tool, with the formation of a step 67g, and guides the tool shank during the shrink fitting.

Figure 15:
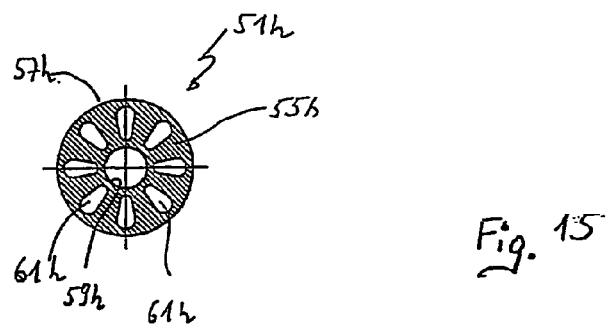
FIG. 15 shows an axial cross section through a further variant of the bush body.

FIG. 15 shows a further variant of a bush body 51h, the bush wall 55h of which is likewise closed in an annular manner in the circumferential direction. Unlike the variants explained with reference to FIGS. 10 to 14, the bush body 51h has passages 61h which are situated entirely inside the bush wall 55h, extend axially over the entire bush length and which, as shown in FIG. 15, may have an elongated shape in cross section and taper radially inward. Instead of elongated cross-sectional shapes, however, the passages 61h may also be circular-cylindrical bores. The outer lateral surface 57h as well as the inner lateral surface 59h are circular-cylindrical, in which case the inner lateral surface 59h may again be stepped in the axial direction, as has been explained above. The cross-sectional area of the passages 61h may be so small that their thermally insulating properties, on account of the cross-sectional reduction of the heat-transmitting bush cross section, can be disregarded compared with the change in the radially elastic properties of the bush body 51h. Just like the bush body in FIGS. 13 and 14, the bush body 51h in FIG. 15 also has properties which improve unshrinking, irrespective of any possible heat-insulating function of its passages. The bush body 51, in accordance with the bush body 51g, may thus be made of the material of the tool holder, in particular of high-temperature steel.

In the variants of the bush body which are explained above with reference to FIGS. 10 to 15, the passages or slots, axially on both sides of the wall region transmitting the pressing forces, end freely either in the end face of the bush body or/and on the inner lateral surface of the bush body. The passages or slots therefore lead past the circumference of the tool shank sitting in an interference fit in the bush body and can thus be used for feeding lubricant or coolant to the tool during operation of the tool holder. The coolant passages indicated at 25 in FIG. 1 may be present in the tool holder; however, the coolant feed may also be effected via the central bore 26 of the tool holder.

Figure 16:
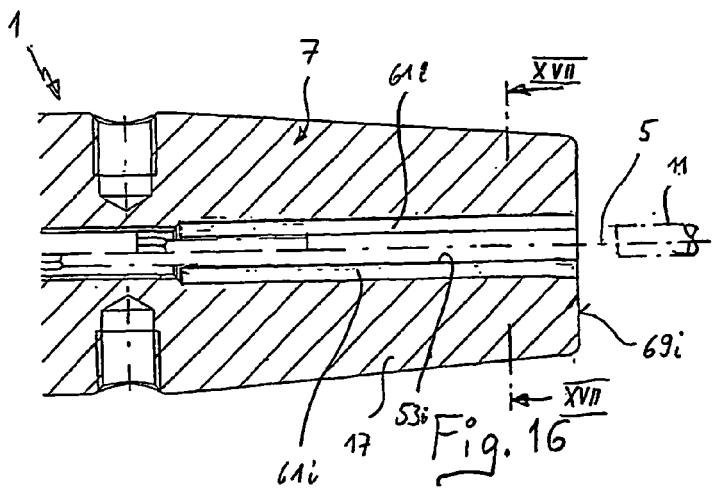
FIG. 16 shows an axial longitudinal section through the bush part, intended for accommodating the tool shank, of a further variant of a tool holder according to the invention.
Figure 17:
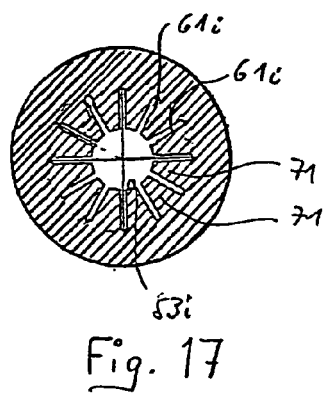
FIG. 17 shows an axial cross section through the bush part along line XVII—XVII in FIG. 16.

FIGS. 16 and 17 show a variant of the tool holder explained with reference to FIGS. 13 and 14, this variant differing from the tool holder in FIGS. 13 and 14 primarily by the fact that the slots 61i starting from the mounting opening 53i are incorporated directly in the material of the bush part 7. That circumferential region 17 of the bush part 7 which adjoins the region of the slots 53i radially on the outside is again closed in an annular manner. However, its expansion behavior is now determined by the diameter of the circumferential circle enclosing the radially outer ends of the slots 61 and no longer by the nominal diameter of the mounting opening 53i. The mounting opening 53i is thus expanded to a greater degree during heating than in the case of a bush part without radial slots and can accordingly be produced with greater tolerances.

The slots 61i start in an open manner from the tool-side end face 69i of the bush part 7 and extend axially over at least 5 to 10 mm, but preferably over the axial length of that region of the bush part 7 which transmits interference-fit forces. In the exemplary embodiment in FIGS. 16 and 17, the mounting opening 53i has a uniform diameter over its entire axial length. However, it may also be stepped, as has been explained with reference to FIGS. 13 and 14.

In order to keep the contact area toward the tool shank 11 as large as possible, this contact area transmitting the torque, the slots 61i are as narrow as possible, for example between 0.1 and 0.5 mm wide, better less than 0.4 mm wide, in the circumferential direction. The slot walls run parallel to one another in order to configure the web regions 71, situated between the slots 61i, for a high bending strength during torque loading. The number of slots 61*i* also constitutes a compromise between a sufficiently large contact area of the mounting opening 53*i* on the one hand and sufficient bending strength of the web regions 71 on the other hand. Between 6 and 20 slots 61*i*, preferably at least 8 slots 61*i*, are expediently provided.

The radial depth of the slots 61*i* expediently depends on the nominal diameter of the mounting opening 53*i*. Within a range having a nominal diameter of less than or equal to 3 mm, the radial depth of the slots is selected to be equal to or greater than 0.5 times the nominal diameter. With increasing nominal diameter, the ratio of slot depth to nominal diameter can be reduced. At a nominal diameter of between 4 mm and 20 mm, a radial slot depth of 2 mm is sufficient in the individual case. At a nominal diameter greater than 25 mm, the slot depth should be at least 2.5 mm. The above depth specifications relate to the region of the end face 69*i*. Even though the slots 61*i* are to have the abovementioned depth dimensions over the entire axial length of the bush part 7, it nonetheless goes without saying that the radial depth of each slot may vary in the longitudinal direction. Slots which are adjacent in the circumferential direction may also have different radial depths.

At least the bush part 7 of the tool holder 1, including the web regions 71, is made of high-temperature steel.

The invention claimed is:

1. A tool holder system for holding a rotary tool having an axis of rotation and a fixing shank, the tool holder system comprising:

a tool holder having a clamping shank and an annularly closed bush part at a tool-side end of the clamping shank, wherein the bush part comprises a mounting opening coaxial to the axis of rotation for mounting the fixing shank of the rotary tool, a radially outer circumferential region, and a radially inner circumferential region; and induction heating means for heating the radially outer circumferential region of the bush part, by means of eddy currents magnetically induced in the bush part, so as to radially expand the mounting opening to a width enabling the fixing shank to be pushed in or pulled out of the mounting opening, wherein by cooling the bush part, the mounting opening is radially shrinkable to a width holding the fixing shank in an interference fit, and wherein the bush part further comprises a plurality of annularly closed heat-insulating apertures provided in the radially inner circumferential region of the bush part and extending along the axis of rotation for reducing the thermal conductivity of the radially inner circumferential region compared with the radially outer circumferential region, thus reducing the radial heat-conducting cross-section of the bush part, and a plurality of slots extending radially outwardly from the mounting opening each in between a pair of adjacent apertures.

2. The tool holder system as claimed in claim 1, wherein the apertures contain air or a heat-insulating solid material.

3. The tool holder system as claimed in claim 1, wherein the radially inner circumferential region, forming the inner circumferential lateral surface of the mounting opening, of the bush part and the radially outer circumferential region are connected to one another in one piece and are made of a homogeneous material.

4. The tool holder system as claimed in claim 1, wherein cooling means are assigned to the bush part, the cooling means, during heating of the radially outer circumferential region of the bush part, reducing the rate of change of the temperature increase in the radially inner circumferential region of the bush part.

5. A tool holder system for holding a rotary tool having an axis of rotation and a fixing shank, the tool holder comprising:

a tool holder having a clamping shank and an annularly closed bush part at a tool-side end of the clamping shank, wherein the bush part comprises a mounting opening coaxial to the axis of rotation for mounting the fixing shank of the rotary tool, a radially outer circumferential region, and a radially inner circumferential region; and induction heating means for heating the radially outer circumferential region of the bush part, by means of eddy currents magnetically induced in the bush part, so as to radially expand the mounting opening to a width enabling the fixing shank to be pushed in or pulled out of the mounting opening, wherein by cooling the bush part, the mounting opening is radially shrinkable to a width holding the fixing shank in an interference fit, and wherein the bush part further comprises a plurality of heat-insulating apertures provided in the radially inner circumferential region of the bush part and extending along the axis of rotation for reducing the thermal conductivity of a radially inner circumferential region compared with the radially outer circumferential region, thus reducing the radial heat-conducting cross section of the bush part, and a web in circumferential direction in between each pair of adjacent apertures, and wherein the apertures have a radially elongated cross-sectional shape which in circumferential direction is wider adjacent the outer circumferential region than adjacent the inner circumferential region.

6. The tool holder system as claimed in claim 5, wherein cooling means are assigned to the bush part, the cooling means, during heating of the radially outer circumferential region of the bush part, reducing the rate of change of the temperature increase in the radially inner circumferential region of the bush part.

7. The tool holder system as claimed in claim 5, wherein the apertures contain air or a heat-insulating solid material.

8. The tool holder system as claimed in claim 5, wherein the radially inner circumferential region, forming the inner circumferential lateral surface of the mounting opening, of the bush part and the radially outer circumferential region are connected to one another in one piece and are made of a homogeneous material.

* * * * *